United States Patent
De Wit et al.

(10) Patent No.: US 8,094,223 B1
(45) Date of Patent: Jan. 10, 2012

(54) BUS DRIVING IN AN IMAGE SENSOR

(75) Inventors: Yannick De Wit, Wilrijk (BE); Nick Witvrouwen, Tildonk (BE)

(73) Assignee: ON Semiconductor Trading Ltd., Hamilton (BM)

( * ) Notice: Subject to any disclaimer, the term of this patent is extended or adjusted under 35 U.S.C. 154(b) by 661 days.

(21) Appl. No.: 12/156,351

(22) Filed: May 29, 2008

Related U.S. Application Data (60) Provisional application No. 60/932,438, filed on May 30, 2007.

(51) Int. Cl.
*H04N 3/14* (2006.01)
*H04N 5/335* (2011.01)

(52) U.S. Cl. .......................... 348/300; 348/302

(58) Field of Classification Search .......... 348/294, 348/300, 301, 302, 308; 326/30, 86, 90; 257/238, 270; 250/208.3, 210; 307/418; 315/388; 323/280; 327/589, 590, 597; 330/77, 330/81, 93, 122, 123, 270
See application file for complete search history.

(56) References Cited

U.S. PATENT DOCUMENTS

| | | | |
|---|---|---|---|
| 4,169,996 A * | 10/1979 | Cavigelli ........................ 330/99 |
| 4,578,646 A * | 3/1986 | Maio et al. .................... 327/341 |
| 4,894,620 A * | 1/1990 | Nagaraj ........................... 327/91 |
| 5,087,890 A * | 2/1992 | Ishiguro et al. ................ 330/259 |
| 5,321,528 A | 6/1994 | Nakamura | |
| 5,335,008 A | 8/1994 | Hamasaki | |
| 5,434,619 A | 7/1995 | Yonemoto | |
| 5,475,337 A * | 12/1995 | Tatsumi ........................ 327/551 |
| 5,949,483 A | 9/1999 | Fossum et al. | |
| 6,462,979 B2 * | 10/2002 | Schlosser et al. .............. 365/158 |
| 6,633,029 B2 * | 10/2003 | Zarnowski et al. ........ 250/214 R |
| 6,677,995 B1 * | 1/2004 | Blanksby et al. ............. 348/301 |
| 7,282,685 B2 * | 10/2007 | Boemler .................... 250/208.1 |
| 7,289,148 B1 | 10/2007 | Dierickx | |
| 7,561,199 B2 * | 7/2009 | Noda et al. .................... 348/308 |
| 7,719,586 B2 * | 5/2010 | Koseki et al. ................. 348/300 |
| 2002/0134918 A1 * | 9/2002 | Miida ......................... 250/214.1 |
| 2008/0079825 A1 * | 4/2008 | Matsuda ...................... 348/241 |

FOREIGN PATENT DOCUMENTS

| | | |
|---|---|---|
| EP | 0260954 | 3/1988 |
| EP | 0481373 | 4/1992 |
| EP | 0773669 | 5/1997 |

OTHER PUBLICATIONS

PCT International Search Report, PCT/BE98/00139, date of search Nov. 13, 1998, mailing date of search report Dec. 18, 1998.
Fillfactory Datasheet IBIS5, Dual Shutter Mode 1.3M Pixel CMOS Image Sensor, Issue 1.0, Mar. 26, 2003, 60 pages.

* cited by examiner

*Primary Examiner* — Nhan T Tran
*Assistant Examiner* — Chriss Yoder, III
(74) *Attorney, Agent, or Firm* — Robert F. Hightower (57) ABSTRACT

A bus driver having one or more feedback paths between a column amplifier and a pixel bus in an image sensor is described.

19 Claims, 7 Drawing Sheets

RELATED ART

FIG. 1

RELATED ART

BUS DRIVING IN AN IMAGE SENSOR

REFERENCE TO RELATED APPLICATION

This application claims the benefit of U.S. Provisional Application No. 60/932,438, filed on May 30, 2007, the entire contents of which are hereby incorporated by reference herein.

TECHNICAL FIELD

The present invention relates generally to image sensors and, more particularly, to bus driving in an image sensor.

BACKGROUND

Solid-state image sensors have found widespread use in camera systems. The solid-state imager sensors in some camera systems are composed of a matrix of photosensitive elements in series with switching and amplifying elements. The photosensitive sensitive elements may be, for example, photoreceptors, photo-diodes, phototransistors, charge-coupled device (CCD) gate, or alike. Each photosensitive element receives an image of a portion of a scene being imaged. A photosensitive element along with its accompanying electronics is called a picture element or pixel. The image obtaining photosensitive elements produce an electrical signal indicative of the light intensity of the image. The electrical signal of a photosensitive element is typically a current, which is proportional to the amount of electromagnetic radiation (light) falling onto that photosensitive element.

Of the image sensors implemented in a complementary metal-oxide-semiconductor (CMOS)- or MOS-technology, image sensors with passive pixels and image sensors with active pixels are distinguished. The difference between these two types of pixel structures is that an active pixel amplifies the charge that is collect on its photosensitive element. A passive pixel does not perform signal amplification and requires a charge sensitive amplifier that is not integrated in the pixel.

Figure 1:
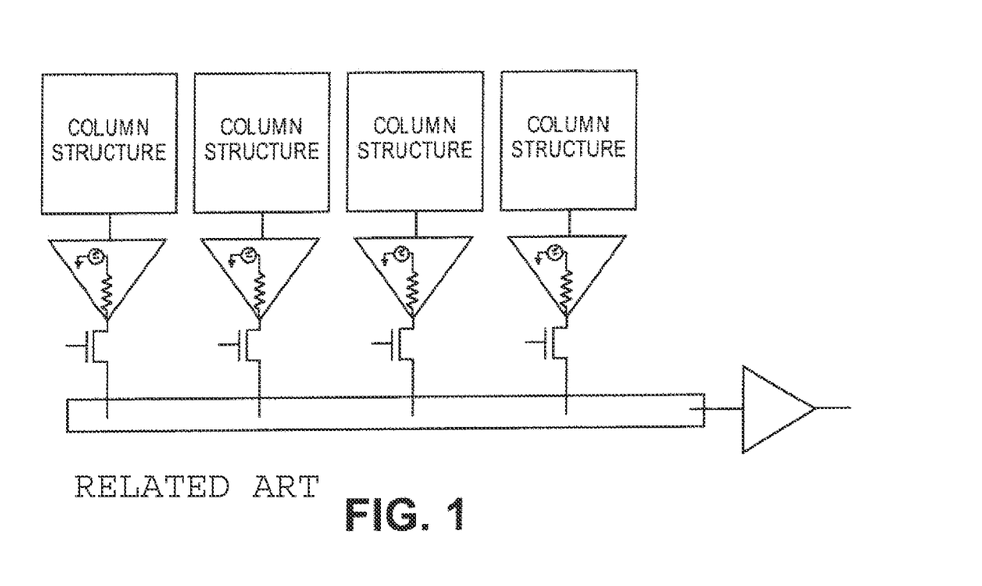
FIG. 1 illustrates bus driving in a conventional CMOS image sensor.
Figure 2:
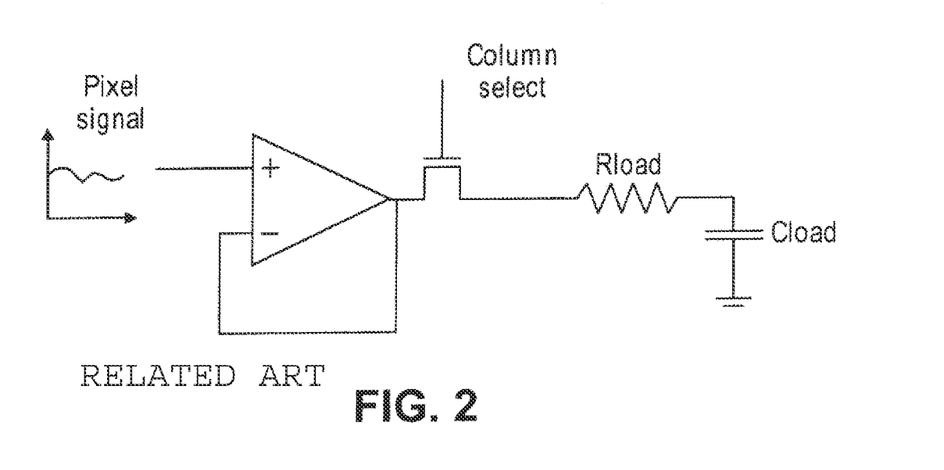
FIG. 2 illustrates a more detailed connection topology in a conventional CMOS image sensor.

FIG. 1 illustrates bus driving in a conventional CMOS image sensor. In the conventional CMOS image sensor of FIG. 1, different columns are connected via a switch to a common bus that brings the signal to an output amplifier. The more detailed illustration of the connection topology is presented in FIG. 2A.

In FIG. 2, Rload and Cload are the parasitic bus metal resistance and capacitance, respectively. The bus driving speed is determined by the amplifier output impedance, column driving switch, the metal resistance, the metal capacitance and all the capacitances of the switches connected to this bus. In most cases, the switch is the limiting factor regarding bus driving speed because the switch cannot be made too large as this increases total bus capacitance. Therefore, the switch impedance is quite high which, in most cases, limits the bus driving speed. This reduces readout speed significantly and requires a lot of buses in a high speed sensor to get a high frame rate. This makes post-bus multiplexing more complex and increases die area which increases the total cost of manufacturing the image sensor.

BRIEF DESCRIPTION OF THE DRAWINGS

The present invention is illustrated by way of example and not limitation in the figures of the accompanying drawings.

DETAILED DESCRIPTION

In the following description, for purposes of explanation, numerous specific details are set forth in order to provide a thorough understanding of the present invention. It will be evident, however, to one skilled in the art that the present invention may be practiced without these specific details. In other instances, well-known circuits, structures, and techniques are not shown in detail or are shown in block diagram form in order to avoid unnecessarily obscuring an understanding of this description.

Reference in the description to "one embodiment" or "an embodiment" means that a particular feature, structure, or characteristic described in connection with the embodiment is included in at least one embodiment of the invention. The appearances of the phrase "in one embodiment" in various places in the specification do not necessarily all refer to the same embodiment. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses. It will also be understood by one having ordinary skill in the art that lines and/or other coupling elements may be identified by the nature of the signals they carry (e.g., a control line or gate may implicitly carry a control signal) and that inputs, outputs and gates may be identified by the nature of the signals they receive or transmit. The terms "first," "second," and the like, as used herein are meant as labels to distinguish among different components and do not have an ordinal meaning according to their numerical designation unless otherwise noted.

A pixel bus driver having one or more feedback paths between a column amplifier and a pixel bus in an image sensor is described. The bus driver described herein may increase the driving speed per bus and provide amplifier circuit stability controlled with an external bias voltage. The embodiments of the connection scheme describe herein may lead to higher frame rates in high speed sensors or a reduction in the amount of busses required to get a specified frame rate compared to the conventional connection schemes.

Figure 3:
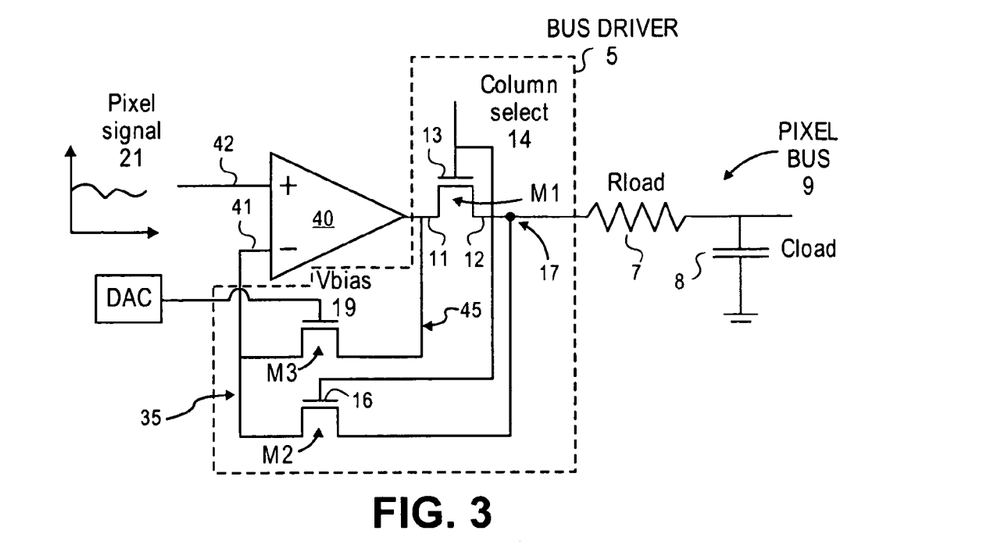
FIG. 3 illustrates a bus driver between column amplifier and bus in an image sensor according to one embodiment of the present invention.
Figure 4:
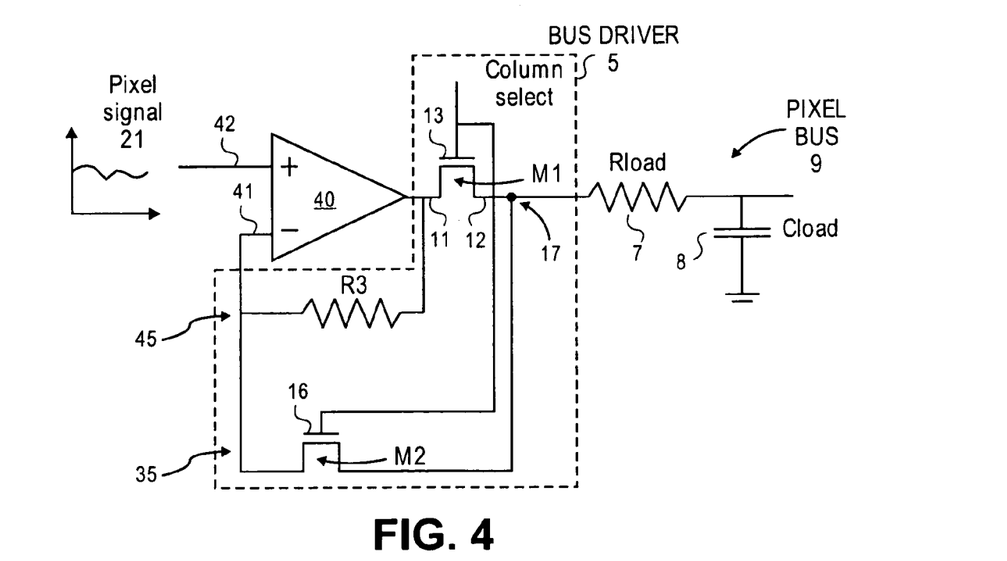
FIG. 4 illustrates an alternative embodiment of a bus driver between column amplifier and bus.

FIG. 3 illustrates one embodiment of a bus driver coupled between column amplifiers and a bus in an image sensor. It should be noted that FIG. 3 illustrates the circuitry that may be coupled to one column of a pixel array and that the image sensor may include multiple ones of column amplifier 40 and bus driver 5 as is discussed below in relation to FIG. 9. The circuitry illustrated in FIG. 3 includes a column amplifier 40 having an input 42 coupled to receive a pixel signal 21 from a column of a pixel array (e.g., output line 1023 of pixel array 1020 of FIG. 9). The output of the column amplifier 40 is coupled to a bus driver 5 which, in turn, is coupled to pixel bus 9. The bus driver includes a transistor M1 that operates as a switch to pass an amplified pixel signal 21 to the pixel bus 9 under the control of the column select signal 14 applied to the gate 13 of transistor M1. In this embodiment, the bus driver 5 includes a dual feedback path 45 and 35 from both the input side 11 and output side 12, respectively, of the bus driving switch, transistor M1, to the inverting input 41 of the column amplifier 40. The pixel bus 9, having parasitic metal resistance Rload 7 and parasitic capacitance Cload 8, is coupled to node 17 of the first feedback path 35. The dual feedback paths increase pixel signal 21 driving speed significantly depending on the open loop gain of the column amplifier 40 and the ratio of the sizes of the transistors M1, M2 and M3 (or the resistor value R3 if transistor M3 is replaced by fixed resistors as shown in FIG. 4). In one exemplary embodiment, the column amplifier 40 is a Miller operational transconductance amplifier (OTA) with a DC open loop gain of 30 dB. A Miller OTA is known in the art; and, accordingly, further details are not provided. Alternatively, other types of amplifiers and amplifiers having other gains may be used.

In one embodiment, the feedback transistor M2 is minimally sized to minimize the bus capacitance Cload 8. That is, transistor M2 operates as a buffer switch to buffer the large input capacitance of the column amplifier 40 from the pixel bus 9. The gates 13 and 16 of transistors M1 and M2 are connected to receive a column select signal 14. The column select signal 14 is the signal that selects a column of pixel array 1020 to put the current pixel signal 21 from that column on the common pixel bus 9.

The first feedback path 45 puts the driving transistor M1 inside the loop of the column amplifier 40. Having the driving transistor M1 inside the loop lowers the feedback path's effective driving impedance, which is divided by the open loop gain of the amplifier 40, thereby increasing bus speed due to overcompensation. This topology may have a downside of reduced phase margin due to an added pole in the loop transfer function which can cause severe ringing or even instability when the open loop gain of the amplifier 40 is high.

Conventional knowledge of skill in the art suggests increasing the conductivity of transistor M1 to shift the pole to a higher frequency, which increases phase margin. However, in an image sensor, all these driving switches are connected to bus 9 and an increase in size would increase the total bus capacitance Cload 8. An increase in the total bus capacitance would degrade overall performance and not have the expected increase in phase margin (it could even degrade phase margin if the added capacitance is more then what is gained in conductivity of the driving switch). A solution to improve the settling and phase margin (and so provide stable operation), according to embodiments of the present invention, is to add an additional feedback path 45 between the output and input of the column amplifier. In one embodiment illustrated in FIG. 3, the additional feedback path includes a biased transistor M3. Alternatively, the second feedback path 45 may have other components, for example, a fixed resistor as illustrated in FIG. 4. The use of a second feedback path 45 brings the pixel signal 21 earlier to input 42 of the column amplifier 40, so amplifier 40 can react faster and increase phase margin. An increased phase margin improves stability and settling time of the image sensor.

In the embodiment illustrated in FIG. 3, transistor's M3 impedance is set by adjusting the voltage, Vbias, 19 on gate of transistor M3. An optimal conductivity of this transistor M3 exists in combination with the input capacitance of the inverting amplifier input 41 and the impedance of transistor M2 to have optimal settling time. For example, Vbias may be selected to be approximately 3V to set transistor M3's impedance to be approximately on the order of 100 ohms to a few Kohms (along with a similar impedance for transistor M2) with an input capacitance in approximately a range of 10-200 femtoFarads (IF) in order to achieve a settling time of approximately 7.5 nanoseconds. It should be noted that such values are only for exemplary purposes and that other component values are within the scope of the present invention.

To externally adjust the settling time and find the optimum conductivity for transistor M3, Vbias 19 may be regulated by a digital-to-analog converter (DAC) on the image sensor, for example, within sequencer 1080 as discussed below in regards to FIG. 9. Alternatively, the gate voltage may be set by circuitry that resides off of the image sensor die. In one embodiment, the column select signal is also an analog voltage that can be adjusted externally (e.g., by sequencer 1080 of FIG. 9). In one embodiment, transistor M3 is set such that M1, M2 and M3 have approximately matching impedances.

Figure 5:
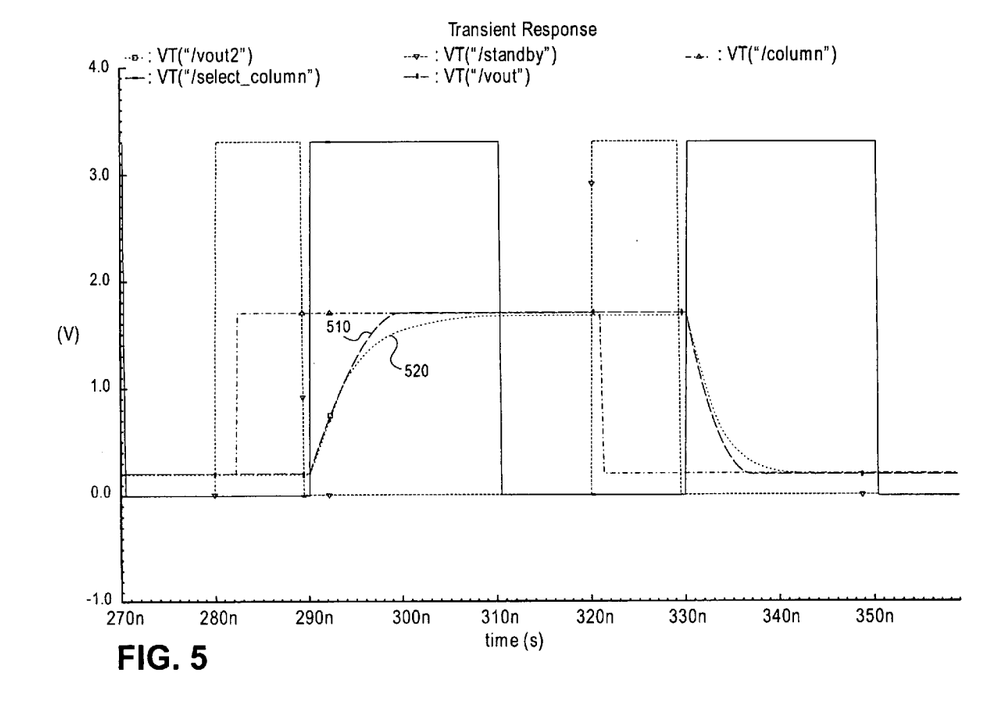
FIG. 5 illustrates the improvement in settling time for the connection topology of FIG. 3 as compared to the conventional connection topology of FIG. 2.

FIG. 5 is a graph illustrates the improvement in settling time for the circuit of FIG. 3 as compared to the conventional image sensor structure of FIG. 2. The plot 510 in FIG. 5 is the bus settling for the image sensor structure of FIG. 3. The plot 520 is the bus settling for the conventional image sensor structure of FIG. 2. As can be seen from an inspection of FIG. 5, a factor 2 gain in bus driving speed may be achieved with the topology embodiment of FIG. 3.

Figure 6:
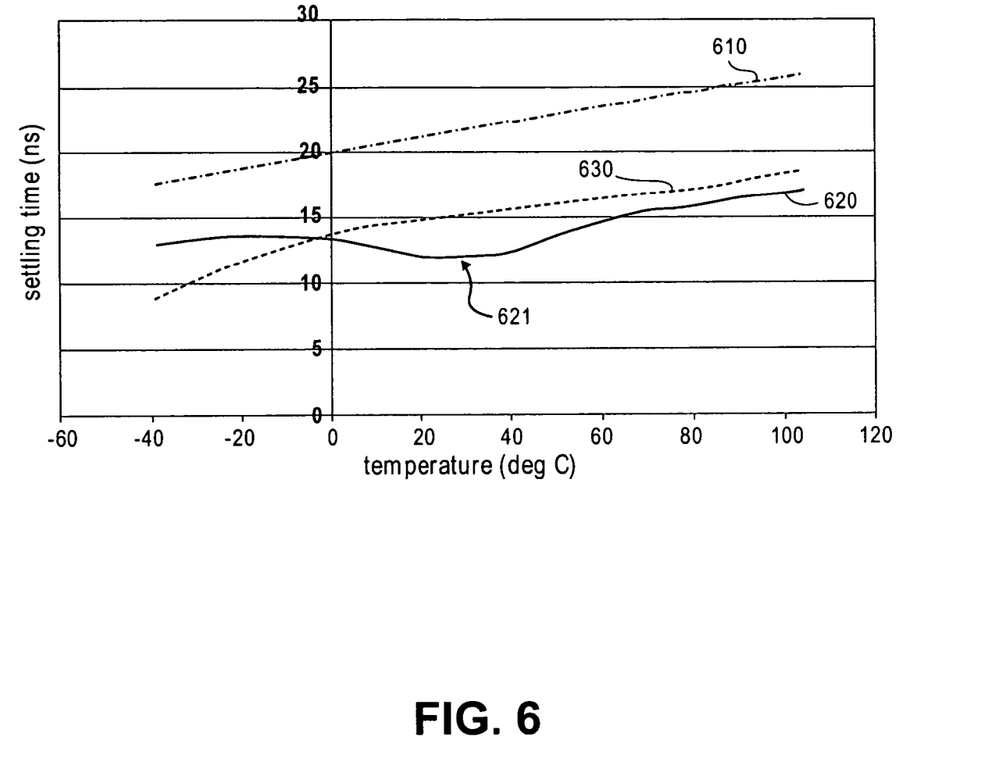
FIG. 6 is a graph illustrates the temperature dependency on the settling time for two different bias voltages of feedback path transistor according to one embodiment of the present invention.

FIG. 6 is a graph illustrating the temperature dependency on the settling time for two different bias voltages of transistor M3. In plot 610, the bus settling time of the convention image sensor structure of FIG. 2 is presented as function of the temperature. Plot 620 represents the settling time as a function of the temperature for an exemplary embodiment of the bus driver of where Vbias 19 of M3 is 3.05 V (e.g., optimized to have optimal settling at 27 degrees C.). The dip 621 in the plot 620 is due to the bias voltage 19 being determined to have optimal settling at 27 degrees C. In plot 630, the bias voltage 19 of M3 is optimized to have an optimal settling at −40 degrees C. In this exemplary embodiment, all settling times are defined to be within 1 mV of final value. This corresponds with 10 bit accuracy if a 1V swing is obtained. The input values for this exemplary case range from 0.3 V to 1.7 V.

The bus driving topology described herein has a normal temperature dependence which also depends on the bias voltage of M3. It has stable operation in the entire temperature range. A very small overshoot is noted when the bias voltage was 3.05 V when temperature was below 0 degrees C. This very small overshoot does not give any problems but, if desired, can easily be removed by increasing the gate bias voltage of M3 as seen in the transient responses for Vbias 19 of M3=3.112 V (the more the second feedback is on, the more stable and more damped the entire circuit will be). It should be noted again that the values provided in FIGS. 5 and 6, and elsewhere, are for exemplary purposes and the other values are within the scope of embodiments of the present invention.

Advantages of embodiments of the present invention include one or more of the following: an increase in bus driving speed may be obtained; lowered driving impedance with driving transistor M1 placed inside the loop of the amplifier; lowered total bus capacitance by buffering the inverting amplifier input from the bus with a small transistor M2; improvement in settling time and stability with the second feedback path having a biased transistor M3 or a resistor R3; optimum setting time and dynamic control by adjustment of the gate voltage of M3; and a higher frame rate due to increase in readout speed.

Figure 7:
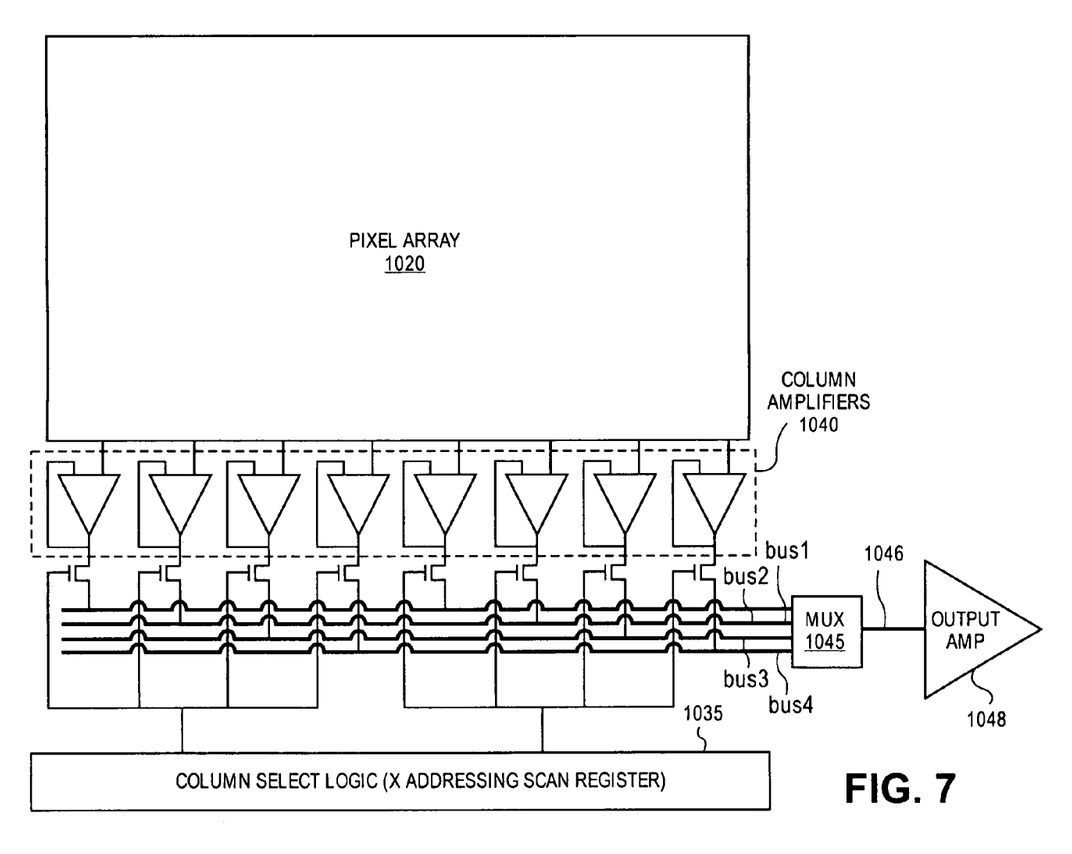
FIG. 7 illustrates an image sensor having the conventional bus driving circuitry of FIG. 2.
Figure 8:
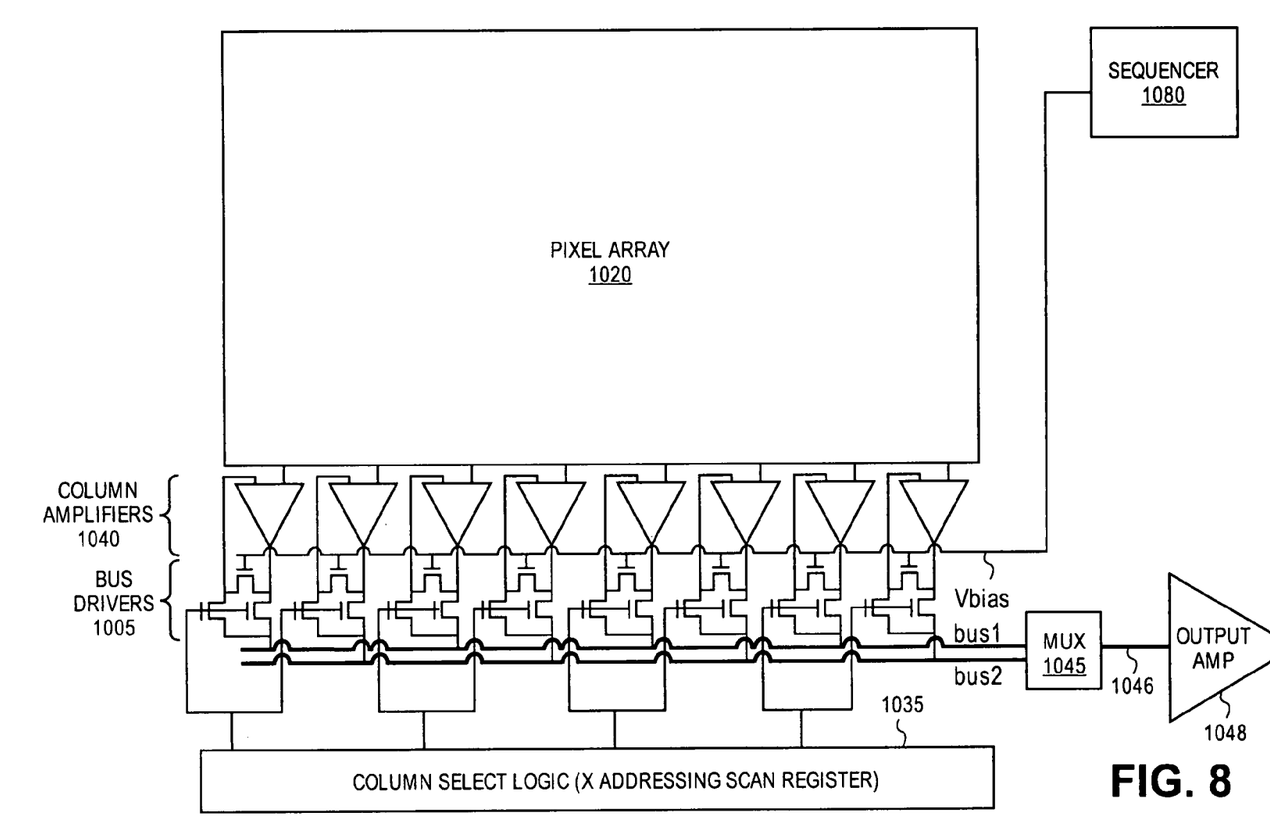
FIG. 8 illustrates an image sensor having bus driving circuitry according to an exemplary embodiment of the present invention in contrast to the conventional image sensor of FIG. 7.

FIGS. 7 and 8 illustrate the reduction in the number of busses that are utilized for an image sensor using the bus driver circuitry described herein. FIG. 7 illustrates an image sensor having the conventional bus driving circuitry of FIG. 2. In this example, four pixel buses (bus1, bus2, bus3, bus4) are required to meet the speed requirement of the image sensor. The 4 pixel busses are then multiplexed by multiplexer (MUX) 1045 to one output bus 1046 and coupled to an output amplifier 1048. In this example, the pixel array outputs 4 pixel kernels and the X addressing scan register 1035 select 4 pixel at once. Using the embodiments of the bus driving circuitry described above, the driving speed of an image sensor may be increased, for example, up to a factor of 2 as illustrated by FIG. 8.

FIG. 8 illustrates an image sensor having the bus driving circuitry of FIG. 3 and with other image sensor parameters being the same as those in the image sensor of FIG. 7. As such, the image sensor illustrated in FIG. 9 only needs 2 pixel buses (bus1, bus2) to meet the read out speed requirement of the image sensor. As a consequence, the post-bus multiplexing performed by MUX 1035 only needs to multiplex from 2 to 1, thus making it less complex. Furthermore, the pixel array 1020 of FIG. 8 is composed of pixel kernels with 2 pixels (i.e., 2 pixel columns will be selected simultaneously by the scan register 1035 in stead of 4, as with the image sensor of FIG. 7). With the bus topology in FIG. 7, every pixel bus may be capable of transferring signals, for example, at 10 MSamples/sec making total output speed 40 Msamples/sec (due to having 4 busses). Continuing this example, with the bus driving topology illustrated in FIG. 8, every pixel bus is capable of transferring signals, for example, up to 20 Msamples/sec, thereby making the image sensor output speed 40 Msamples/sec with only 2 pixel busses or 80 Msamples/sec with 4 pixel busses. As such, an image sensor output speed can be doubled with the same amount of pixel busses or the amount of pixel busses can be reduced by a factor 2 while having the same output speed.

Figure 9:
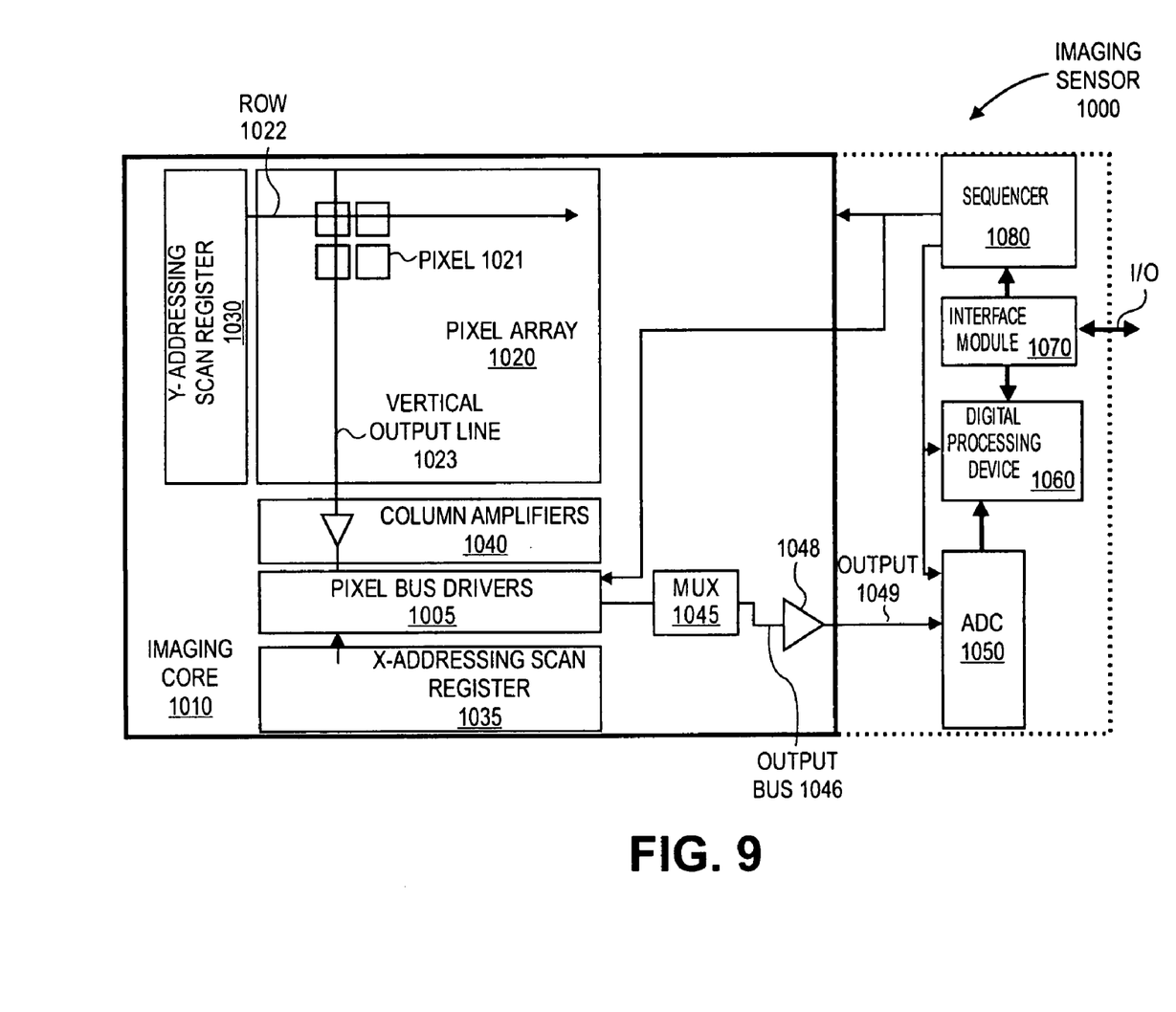
FIG. 9 illustrates an image sensor implementing the bus driving circuitry according to an embodiment of the present invention.

FIG. 9 illustrates one embodiment of an image sensor implementing the bus driving circuitry described herein. Image sensor 1000 includes an imaging core 1010 and components associated with the operation of the imaging core. The imaging core 1010 includes a pixel array 1020 having an array of pixels (e.g., pixel 1021) and the corresponding driving and sensing circuitry for the pixel array 1020. The driving and sensing circuitry may include: one or more scanning registers 1035, 1030 in the X- and Y-direction in the form of shift registers or addressing registers; buffers/line drivers for the long reset and select lines; column amplifiers 1040 that may also contain fixed pattern noise (FPN) cancellation and double sampling circuitry; and analog multiplexer (MUX) 1045 coupled to an output bus 1046. FPN has the effect that there is non-uniformity in the response of the pixels in the array. Correction of this non-uniformity needs some type of calibration, for example, by multiplying or adding/subtracting the pixel's signals with a correction amount that is pixel dependent. Circuits and methods to cancel FPN may be referred to as correlated double sampling or offset compensation and are known in the art; accordingly, a detailed description is not provided.

The pixel array 1020 may be arranged in N rows of pixels by N columns of pixels (with N≧1), with each pixel (e.g., pixel 1021) is composed of at least a photosensitive element and a readout switch (not shown). A pixel array is known in the art; accordingly, a more detailed description is not provided.

The Y-addressing scan register(s) 1030 addresses all pixels of a row (e.g., row 1022) of the pixel array 1020 to be read out, whereby all selected switching elements of pixels of the selected row are closed at the same time. Therefore, each of the selected pixels places a signal on a vertical output line (e.g., line 1023), where it is amplified in the column amplifiers 1040. An X-addressing scan register(s) 1035 provides control signals to the analog multiplexer 1045 to place an output signal (amplified charges) of the column amplifiers 1045 onto output bus 1046. The output bus 1046 may be coupled to a buffer 1048 that provides a buffered, analog output 1049 from the imaging core 1010.

The output 1049 from the imaging core 1010 is coupled to an analog-to-digital converter (ADC) 1050 to convert the analog imaging core output 1049 into the digital domain. The ADC 1050 is coupled to a digital processing device 1060 to process the digital data received from the ADC 1050 (such processing may be referred to as imaging processing or post-processing). The digital processing device 1060 may include one or more general-purpose processing devices such as a microprocessor or central processing unit, a controller, or the like. Alternatively, digital processing device 1060 may include one or more special-purpose processing devices such as a digital signal processor (DSP), an application specific integrated circuit (ASIC), a field programmable gate array (FPGA), or the like. Digital processing device 1060 may also include any combination of a general-purpose processing device and a special-purpose processing device.

The digital processing device 1060 is coupled to an interface module 1070 that handles the information input/output (I/O) exchange with components external to the image sensor 1000 and takes care of other tasks such as protocols, handshaking, voltage conversions, etc. The interface module 1070 may be coupled to a sequencer 1080. The sequencer 1080 may be coupled to one or more components in the image sensor 1000 such as the imaging core 1010, digital processing device 1060, and ADC 1050. The sequencer 1080 may be a digital circuit that receives externally generated clock and control signals from the interface module 1070 and generates internal pulses to drive circuitry in the imaging sensor for example, bus drivers 1005, ADC 1050, etc. In one embodiment, the image sequencer 1080 may include the DAC functions described above in FIG. 3 used to generate gate voltage Vbias 19 to control the M3 transistor. Alternatively, the DAC used to generate Vbias may be separate from sequencer circuitry.

It should be noted that the image sensor illustrated in FIG. 9 is only an exemplary embodiment and an image sensor may have other configurations than that depicted. For example, alternative embodiments of the image sensor 1000 may include one ADC 1050 for every pixel 300, for every column (i.e., vertical output line 1023), or for a subset block of columns. Similarly, one or more other components within the image sensor 1000 may be duplicated and/or reconfigured for parallel or serial performance. For example, a fewer number of column amplifiers 1040 than pixel matrix columns may be used, with column outputs of the pixel matrix multiplexed into the column amplifiers. Similarly, the layout of the individual components within the image sensor 1000 may be modified to adapt to the number and type of components. In another embodiment, some of the operations performed by the image sensor 1000 may be performed in the digital domain instead of the analog domain, and vice versa.

The image sensor 1000 discussed herein may be used in various applications. In one embodiment, the image sensor 1000 discussed herein may be used in a digital camera system, for example, for general-purpose photography (e.g., camera phone, still camera, video camera) or special-purpose photography. Alternatively, the image sensor 1000 discussed herein may be used in other types of applications, for example, machine vision, document scanning, microscopy, security, biometry, etc.

Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

What is claimed is:

1. An image sensor, comprising:
   a bus;
   a column amplifier having an input and an output; and
   a first feedback path coupled between the output of the column amplifier and the input of the column amplifier, wherein the bus is coupled to a node within the first feedback path, the first feedback path including a first transistor having an input coupled to the output of the column amplifier and an output coupled to the bus at the node, and also including a second transistor having an input coupled to the bus at the node and an output coupled to the input of the column amplifier, wherein the first and second transistors are operated substantially in phase.

2. The image sensor of claim 1, further comprising a second feedback path coupled between the output of the column amplifier and the input of the column amplifier.

3. The image sensor of claim 2, wherein the second feedback path comprises a resistor.

4. The image sensor of claim 2, wherein the second feedback path comprises a third transistor.

5. The image sensor of claim 4, wherein the third transistor has an adjustable gate voltage.

6. The image sensor of claim 5, wherein the gate voltage of the third transistor is coupled to digital-to-analog (DAC) circuitry.

7. The image sensor of claim 6, further comprising a sequencer having the DAC circuitry.

8. The image sensor of claim 5, wherein the gate voltage of the third transistor is coupled to an input/output (I/O) pin of the image sensor.

9. The image sensor of claim 1, further comprising:
   a pixel array having a column of pixels coupled to another input of the column amplifier;
   a multiplexer coupled to the bus; and
   an output amplifier coupled to the multiplexer.

10. An image sensor, comprising:
    a bus;
    a column amplifier having an input and an output; and
    a first feedback path coupled between the output of the column amplifier and the input of the column amplifier, wherein the bus is coupled to a node within the first feedback path, the first feedback path including a first transistor having an input coupled to the output of the column amplifier and an output coupled to the bus at the node, and also including a second transistor having an input coupled to the bus at the node and an output coupled to the input of the column amplifier; and
    a second feedback path coupled between the output of the column amplifier and the input of the column amplifier, the second feedback path comprises a third transistor, wherein the first transistor, the second transistor and the third transistor have approximately matching impedances.

11. A method, comprising:
    providing, in an image sensor, a driving switch in a first feedback path between an output of a column amplifier and an input of the column amplifier, wherein the driving switch is coupled to a pixel bus; and
    providing, in the image sensor, a buffer switch in the first feedback path to buffer an input capacitance of the column amplifier from the pixel bus, wherein the driving switch and the buffer switch have approximately matching impedances.

12. The method of claim 11, further comprising providing a second feedback path between the output of the column amplifier and the input of the column amplifier.

13. The method of claim 12, wherein the second feedback path comprises a resistor.

14. A method, comprising:
    providing, in an image sensor, a driving switch in a first feedback path between an output of a column amplifier and an input of the column amplifier, wherein the driving switch is coupled to a pixel bus; and
    providing, in the image sensor, a buffer switch in the first feedback path to buffer an input capacitance of the column amplifier from the pixel bus, and further comprising providing a second feedback path between the output of the column amplifier and the input of the column amplifier, wherein the second feedback path comprises a feedback transistor having a gate.

15. The method of claim 14, further comprising adjusting a bias voltage applied to the gate of the feedback transistor to substantially match an impedance of the feedback transistor to impedances of the driving switch and the buffer switch.

16. The method of claim 15, wherein the bias voltage is adjusted by digital to analog circuitry within the image sensor.

17. The method of claim 15, wherein the bias voltage is adjusted by circuitry disposed off of the image sensor.

18. An image sensor, comprising:
    means for driving one or more pixel buses in the image sensor, the means for driving including a driver switch coupled to an output of the means for driving, and further including a buffer switch in a feedback path of the means for driving; and
    means for increasing a frame rate of the image sensor by reducing a settling time of the one or more pixel buses using the means for driving, wherein the means for driving and the means for increasing are operated substantially in phase for driving the one or more pixel buses.

19. The image sensor of claim 18, wherein the means for increasing the frame rate reduces the settling time without increasing a total capacitance of the one or more pixel buses.

* * * * *